United States Patent

[11] 3,634,154

[72] Inventor George William Burdette
China Lake, Calif.
[21] Appl. No. 305,555
[22] Filed Aug. 29, 1963
[45] Patented Jan. 11, 1972
[73] Assignee The United States of America as
represented by the Secretary of the Navy

[54] SOLID PROPELLANT COMPOSITION CONTAINING GELLED HYDRAZINE
8 Claims, No Drawings
[52] U.S. Cl......................................................... 149/20,
149/36, 264/3 R
[51] Int. Cl......................................................... C06d 5/10,
C101 5/00, C101 7/00
[50] Field of Search............................................ 149/36,
17–20, 37, 44; 60/35.4; 44/7; 264/3

[56] References Cited
UNITED STATES PATENTS
3,492,177 1/1970 Rau et al....................... 149/36 X Primary Examiner—Benjamin R. Padgett
Attorneys—R. S. Sciascia and R. Miller

CLAIM: 1. A method for the preparation of a propellant composition which comprises the steps of
a. stirring antimonyl potassium tartrate crystals into a solution consisting of hydrazine and sodium carboxymethylcellulose at room temperature until a homogeneous mixture results, and
b. curing said mixture overnight; whereby a nonreversible gel forms.

SOLID PROPELLANT COMPOSITION CONTAINING GELLED HYDRAZINE

The invention described herein may be manufactured and used by or for the Government of the United States of America for governmental purposes without the payment of any royalties thereon or therefor.

The present invention relates to a propellant composition and to the preparation thereof; more specifically, to an improved high-performance solid propellant utilizing hydrazine in a system that is solid at ambient temperature.

Those concerned with the development of improved propellant systems have recognized the need for high-energy, high-performance solid propellants which have practical large-scale production. The present invention fulfills this need.

It is an object of this invention to provide a composition for use as a solid fuel for hybrid rockets.

Another object is to provide a solid propellant composition with increased time for casting rocket motors (pot life).

A further object of the invention is the provision of a method for preparing a high-performance solid hybrid propellant which is economical, practical, and timesaving.

Other objects, features and many of the attendant advantages of this invention will become readily appreciated as the same become better understood by reference to the detailed description.

In order to utilize hydrazine in a high-performance propellant formulation that would be solid at ambient temperature additives are needed to effectively trap the relatively small hydrazine molecules. The approach taken was to form a polymeric gel utilizing hydrazine as the plasticizer. Many high molecular weight polymers were tested in an attempt to find some that were soluble in but not degraded by hydrazine. In table 1 below are listed some of the polymers that were tried at the 10 percent level at room temperature.

TABLE 1. Polymers Tried for Hydrazine Gelation

| Gelling agent | Results |
| --- | --- |
| Ethylcellulose | Insoluble |
| Polyvinyl acetate | Thick syrup |
| Casein | Insoluble |
| Poly 1,1,2-trifluorobutadiene | Insoluble |
| Vinyl acetate | Thin syrup |
| Polyvinyl alcohol | Thick syrup |
| Sodium carboxymethylcellulose (CMC) | Rigid gel on standing |
| Hydroxyethylcellulose | Thick gel |
| Cellulose acetate | Thixotropic gel |
| Polyvinylpyrrolidone | No gel |
| Polyacrylamide | Weak gel |
| Amylopectin | No gel |
| Guar Gum | Weak gel |
| Polyetheranhydride | Gel (degrades with time) |
| Sodium alginate | Thick gel |

Of the various gelling agents tried sodium carboxymethylcellulose (CMC) looked most promising. However, this gel had little physical strength and the rate of gellation was too rapid resulting in shorter mixing and casting times than are desirable for large-scale processing. An effort to find a cross-linking agent for the hydrazine-sodium-carboxymethylcellulose system to strengthen the gel resulted in a series of experiments using various salts. Ferric hypophosphite and basic aluminum acetate favorably affected the gelling properties of aqueous carboxymethylcellulose (CMC) solutions. When these salts were tried in the hydrazine-sodium-carboxymethylcellulose solution, the results were unfavorable. Table 2 below is a tabulation of the various salts that were tried as cross-linking agents for the hydrazine-sodium-carboxymethylcellulose system at the 0.5 percent level.

TABLE 2. Hydrazine Gel Cross-linking Agents

| Salts | Results |
| --- | --- |
| Aluminum nitrate | No additional strength |
| Aluminum sulfate | No additional strength |
| Aluminum acetate | No additional strength |
| Antimony sulfide | No gel |
| Basic aluminum acetate | Slightly stronger than unmodified gel* |
| Cadmium acetate | No additional strength |
| Sodium acetate | No additional strength |
| Butyl acetate | No additional strength |
| Aluminum hydroxide | No additional strength |
| Uranyl acetate | Gelled rapidly and was slightly stronger than unmodified gel |
| Sodium potassium tartrate | Gelled slowly to form a weak gel |
| Antimonyl potassium tartrate | Tough, rubbery gel |

*An unmodified gel contains no salts.

It was apparent that antimonyl potassium tartrate which is quite soluble in hydrazine was by far the best cross-linking agent. Further investigation revealed that the most effective cross-linking occurs when an amount of antimonyl potassium tartrate equal to 15–20 percent by weight of the sodium carboxymethylcellulose in the system is used. Cross-linking begins upon addition of the antimonyl potassium tartrate to the sodium carboxymethylcellulose-hydrazine mixture and proceeds for several days. The cross-linked gels are much stronger than the uncross-linked gels making them more suitable for propellant application.

The invention is further illustrated by the following examples in which the percentages are by weight unless otherwise specified.

EXAMPLE I

| Ingredients | Weight % |
| --- | --- |
| Antimonyl potassium tartrate (APT) | 1 |
| Hydrazine ($N_2H_4$) | 90 |
| Sodium carboxymethylcellulose (CMC) | 9 |

The antimonyl potassium tartrate crystals were dissolved in the liquid hydrazine, then the sodium carboxymethylcellulose was stirred into the solution until a homogeneous mixture was obtained. In about 15 minutes the mixture thickened and on standing overnight a gray, tough nonreversible gel formed.

EXAMPLE II

| Ingredients | Weight—grams |
| --- | --- |
| Antimonyl potassium tartrate | 0.2 |
| Hydrazine | 9.0 |
| Sodium carboxymethylcellulose | 0.9 |

When the above ingredients were mixed thoroughly together the mixture remained very fluid for about 10 minutes at room temperature. On standing overnight a very tough nonreversible gel formed.

EXAMPLE III

| Ingredients | Weight—grams |
| --- | --- |
| Antimonyl potassium tartrate | 0.3 |
| Hydrazine | 9.0 |
| Sodium carboxymethylcellulose | 0.9 |

The above ingredients were thoroughly stirred until a homogeneous mixture resulted which remained fluid for about 10 minutes. Overnight it formed a tougher gel than the formulations set forth in examples I and II above which used less antimonyl potassium tartrate. This gel was also very rubbery.

EXAMPLE IV

| Ingredients | Weight % |
|---|---|
| Uranyl acetate | 1 |
| Hydrazine | 90 |
| Sodium carboxymethylcellulose | 9 |

The above ingredients were mixed together and a gel formed in about 5 minutes which on standing became quite tough.

EXAMPLE V

| Ingredients | Weight % |
|---|---|
| Antimonyl sulfide | 1 |
| Hydrazine | 90 |
| Sodium carboxymethylcellulose | 9 |

A nonflowing gel formed in 5 minutes when the above ingredients were mixed together.

Although tough gel resulted from the formulations used in examples IV and V, the available time for casting motors (pot life) was much too short after the mix was obtained because the gel viscosity increased so rapidly that the mixture was nonpourable minutes after mixing.

As demonstrated in examples I–III it was found that the cross-linking agent, sodium potassium tartrate, slowed down the gelling rate considerably.

EXAMPLE VI

| Ingredients | Weight—grams |
|---|---|
| Antimonyl potassium tartrate | 3.75 |
| Hydrazine | 100. |
| Sodium carboxymethylcellulose | 15. |

The above ingredients were stirred together for about an hour until a homogeneous mixture resulted. Upon standing overnight the mixture cured to a flexible, nonflowing gel. After standing for one week the gel appeared unchanged and no hydrazine had condensed on the top. It was noted that the gel had turned a darker gray in color.

It was found that to increase the basicity of the system by adding amines such as unsymmetrical dimethylhydrazine (UDMH), tetramethylguanidine (TMG), and triaminoguanidine (TAG) effectively increased the pot life. In the following examples in which aluminum and zirconium powders were used as fuel additives, tetramethylguanidine was used primarily because of its effectiveness in small quantities and ease of handling.

EXAMPLES VII

| Ingredients | Weight % |
|---|---|
| Hydrazine (liquid) | 40.0 |
| Tetramethylguanidine (liquid) | 0.1 |
| Aluminum (powder) | 45.0 |
| Sodium carboxymethylcellulose (solid) | 12.0 |
| Antimonyl potassium tartrate (solid) | 2.9 |

The mixing technique for the hydrazine gel system containing the metal powder additives as above set out was fairly simple. The solid materials were blended thoroughly, and then the liquids, which had also been mixed, were added. The mixture was stirred until homogeneity was obtained. Viscosity increases in the system as the sodium carboxymethylcellulose (CMC) gradually swells. After about 30 minutes the viscosity is sufficiently high to prevent settling of the aluminum particles. It was found that hydrazine prethickened with a small amount of sodium carboxymethylcellulose before being mixed with the other materials, causes a more rapid suspension of the metal additives before much swelling of the additional sodium carboxymethylcellulose (CMC) takes place. This rapid suspension method aids in producing a mix with a longer pot life. About 50 minutes is available for casting and other processing.

EXAMPLES VIII

| Ingredients | Weight % |
|---|---|
| Solid Components | |
| Aluminum | 46.3 |
| Sodium carboxymethylcellulose | 10.7 |
| Antimonyl potassium tartrate | 2.6 |
| Liquid Component | |
| Hydrazine | 40.4 |

The above ingredients were mixed in the same manner described in example VII, wherein the solids were blended well, then the liquids were added and stirred until a homogeneous mixture resulted. The mixture was cast in a motor tube and stored at a constant temperature of 60° C. for 30 days. Inspection showed no liquid hydrazine visible, no slumping of the rigid gel, and no dry surface areas.

Table 3 which follows gives the results of physical tests on a few of the sodium carboxymethylcellulose hydrazine-aluminum compositions.

TABLE 3.—RESULTS OF PHYSICAL PROPERTIES TESTS ON CMC-HYDRAZINE-Al

| Gel composition | Curing time at room temperature (day) | Maximum tensile strength, p.s.i. | Elongation at maximum tensile strength, percent | Modulus, p.s.i./in./in. |
|---|---|---|---|---|
| 33.3 $N_2H_4$ | 4 | 7 | 25 | 41 |
| 0.1 TMG | | | | |
| 56.6 Al | | | | |
| 8.0 CMC | | | | |
| 2.0 APT | | | | |
| 2.0 APT | 7 | 18 | 27 | 101 |
| 2.0 APT | 25 | 17 | 31 | 88 |
| 35.7 $N_2H_2$ | 7 | 24 | 42 | 93 |
| 0.2 TMG | | | | |
| 46.3 Al | | | | |
| 14.3 CMC | | | | |
| 3.5 APT | | | | |
| 3.5 APT | 25 | 24 | 47 | 104 |

EXAMPLE IX

| Ingredients | Weight % |
|---|---|
| Solid Components | |
| Zirconium | 60. |
| Aluminum | 2.8 |
| Sodium Carboxymethylcellulose | 6.9 |
| Antimonyl potassium tartrate | 1.7 |
| Liquid Components | |
| Hydrazine | 28.5 |
| Tetramethylguanidine | 0.1 |

The above ingredients were combined in the manner described in example VII. The mixture was cast in a small motor tube and stored at 60° C. for about 30 days. It built up a slight pressure and showed some slight decomposition after cooling to ambient temperature. This was thought to be caused by the reactivity of the zirconium powder due to its greater surface area resulting from its amorphous shape.

EXAMPLE X

| Ingredients | Weight—grams |
| --- | --- |
| Solid Components | |
| Zirconium (20μ) | 21.0 |
| Aluminum powder | 1.0 |
| Antimonyl potassium tartrate | 0.75 |
| Sodium carboxymethylcellulose | 2.25 |
| Liquid Component | |
| Hydrazine | 10.0 |

The antimonyl potassium tartrate was dissolved in the hydrazine, then the other solids which had been thoroughly mixed were added. The mixture set up in 5 minutes, and on standing overnight had gelled. Stretching tests showed it to be rubbery ant tough.

EXAMPLE XI

| Ingredients | Weight—grams |
| --- | --- |
| Solid Components | |
| Zirconium (20μ) | 1160 |
| Sodium carboxymethylcellulose | 128 |
| Antimonyl potassium tartrate | 32 |
| Liquid Components | |
| Hydrazine | 400 |
| Tetramethylguanidine | 1.5 |

In preparing this formulation the solid components were blended together and the liquid components were blended, then the solids were stirred into the liquid until homogeneity resulted. The mixture was cast into two propellant grains and cured for several days at ambient temperature. The zirconium was desensitized to electrostatic discharge by premixing it with the sodium carboxymethylcellulose binder before it is added to the hydrazine.

Metal powders such as beryllium, lithium, zirconium, aluminum and magnesium show considerable promise as fuel additives in solid propellant systems. Because of the high heat of combustion of these metals, it is postulated that their use in the hydrazine-gel propellant system will improve the specific impulse of the propellants.

Furthermore, the incorporation of wire screen structure into the gels will add additional physical strength. Several hydrazine-gel samples with screen reinforcement were prepared and proved to be superior in physical strength to unreinforced samples.

There is little, if any, new hazard involved in preparing the hydrazine containing propellant compositions. The necessary precaution associated with hydrazine work, such as avoidance of inhalation of hydrazine vapors and direct skin contact still hold. Hydrazine itself is considered insensitive to shock. No problem has been experienced with aluminum powder as small as 13μ when added to hydrazine. The 20μ zirconium powder is desensitized by premixing it with the powdered carboxymethylcellulose binder before it is added to the hydrazine.

When samples of gelled hydrazine containing aluminum or zirconium were attached to a mercury manometer at ambient temperature no gas evolution due to decomposition was observed.

Initial static firing tests of the metal-loaded hydrazine-gel system in a hybrid motor using chlorine trifluoride as the liquid oxidizer resulted in the ejection of unburned gel particles. The amount of unburned particles ejected during firing appeared to diminish considerably with the use of rigid gels that had been in storage for longer periods of time than those previously fired.

Obviously, many modifications and variations of the present invention are possible in the light of the above teachings. It is therefore to be understood that within the scope of the appended claims the invention may be practiced otherwise than as specifically described.

What is claimed is:

1. A method for the preparation of a propellant composition which comprises the steps of
   a. stirring antimonyl potassium tartrate crystals into a solution consisting of hydrazine and sodium carboxymethylcellulose at room temperature until a homogeneous mixture results, and
   b. curing said mixture overnight; whereby a nonreversible gel forms.

2. A composition consisting of the following ingredients:
   hydrazine
   sodium carboxymethylcellulose and
   antimonyl potassium tartrate.

3. A method for the manufacture of a solid propellant grain comprising
   1. preparing a mixture of up to 90 percent by weight hydrazine, up to 12 percent by weight sodium carboxymethylcellulose and up to 4 percent by weight antimonyl potassium tartrate,
   2. casting said mixture in a motor casing, and
   3. curing for about 24 hours at ambient temperature, whereby a nonreversible gel forms.

4. A composition consisting of the following constituents:

| Constituents | Percent by weight |
| --- | --- |
| Hydrazine | 85 to 90 |
| Sodium carboxymethylcellulose | 9 to 12 |
| Antimonyl potassium tartrate | 1 to 4 |

5. A composition consisting essentially of the following constituents:

| Solid Constituents | Percent by weight |
| --- | --- |
| Aluminum | 46.3 |
| Sodium carboxymethylcellulose | 10.7 |
| Antimonyl potassium tartrate | 2.6 |
| Liquid Constituent | |
| Hydrazine | 40.4 |

6. A method for the preparation of solid propellant grains comprising
   a. preparing a dry mixture consisting essentially of aluminum powder, sodium carboxymethylcellulose and antimonyl potassium tartrate,
   b. stirring hydrazine into said mixture until a homogeneous composition results,
   c. casting the composition into a motor tube, and
   d. curing at a constant temperature of 60° C. for about 30 days.

7. A method for the preparation of solid propellant grains comprising
   a. preparing a dry mixture consisting of a metal powder selected from the group consisting of beryllium, lithium, zirconium, aluminum, and magnesium, or mixtures thereof, and a binder consisting of sodium carboxymethylcellulose;
   b. preparing a liquid mixture consisting of antimonyl potassium tartrate crystals dissolved in hydrazine and c. stirring said mixtures together until a viscous composition results,
d. casting the composition into motor tubes, and curing for 30 days at a temperature of about 60° C.

8. A composition consisting essentially of the following constituents

| Constituents | Weight—grams |
|---|---|
| Zirconium | 21.0 |
| Aluminum | 1.0 |
| Antimonyl potassium tartrate | 0.75 |
| Sodium carboxymethylcellulose | 2.25 |
| Hydrazine | 10.0 |

* * * * *